United States Patent [19]

Shonka

[11] Patent Number: 5,165,836
[45] Date of Patent: Nov. 24, 1992

[54] ROUND BALE HAULER

[76] Inventor: Ernest Shonka, Rte. 1, Box 137, Schuyler, Nebr. 68661

[21] Appl. No.: 687,233

[22] Filed: Apr. 18, 1991

[51] Int. Cl.⁵ .............................................. B60D 1/02
[52] U.S. Cl. ..................... 414/111; 280/467; 280/494; 414/24.5; 414/459; 414/460; 414/481; 414/483; 414/485; 414/920
[58] Field of Search .............. 414/24.5, 24.6, 111, 414/920, 481, 483, 485, 458, 459, 460, 482; 280/409, 410, 411.1, 412, 413, 467, 494

[56] References Cited

U.S. PATENT DOCUMENTS

| | | | |
|---|---|---|---|
| 3,905,619 | 9/1975 | Sylvester | 280/494 X |
| 4,042,140 | 8/1977 | McFarland | 414/518 |
| 4,076,137 | 2/1978 | Kucera | 414/24.5 X |
| 4,204,789 | 5/1980 | Parks, Jr. | 414/24.5 |
| 4,204,790 | 5/1980 | Baxter | 414/24.5 |
| 4,227,844 | 10/1980 | Love | 414/24.5 |
| 4,248,560 | 2/1981 | Roose | 414/24.5 |
| 4,248,561 | 2/1981 | Graves | 414/24.5 |
| 4,266,898 | 5/1981 | Jacobsen et al. | 414/24.5 |
| 4,396,330 | 8/1983 | Rozeboom | 414/24.5 |
| 4,415,300 | 11/1983 | Boddicker | 414/24.5 |
| 4,521,149 | 6/1985 | Redding et al. | 414/458 X |
| 4,537,548 | 8/1985 | Lockhart | 414/24.5 |
| 4,652,196 | 3/1987 | Woerman | 414/24.5 |

FOREIGN PATENT DOCUMENTS 2821991 11/1979 Fed. Rep. of Germany .

Primary Examiner—Michael S. Huppert
Assistant Examiner—Janice Krizek
Attorney, Agent, or Firm—John A. Beehner

[57] ABSTRACT

An apparatus for lifting and transporting one or more large bales of material, comprising a trailer to be towed by a towing device and hydraulically powered by an outside source, preferably incorporated in the towing vehicle. The apparatus has tines adapted to fit beneath a bale and cradle and lift the bale in the manner of a fork lift, which is done by exerting force downwards on the wheels of the trailer, thus lifting the frame and attached tines. Connection to the towing device's three-point hitch also affords a lifting device. A device may be provided for shifting the trailer between a transport position, where the trailer is generally aligned behind the towing device, and a working position where the trailer is aligned outwardly and behind the towing device. The tines are positioned generally horizontally and substantially parallel with the longitudinal axis of the trailer. Bales are lifted by the apparatus off the ground for transportation.

11 Claims, 3 Drawing Sheets

ROUND BALE HAULER

BACKGROUND OF THE INVENTION

1. Technical Field

This invention relates to an apparatus for lifting and transporting large bales of material, such as hay or the like, and more particularly to a trailer adapted to be towed by a towing device such as a tractor, designed to lift large cylindrical bales of hay for transport to a desired location.

2. Description of the Prior Art

Much hay is baled in such cylindrical bales as mentioned above, which results in a need for a powered device to be developed to handle the large bales, which are generally from 5 to 6 feet in diameter, 4 to 6 feet long, and weigh from 800 to 2,000 pounds. These bales must be taken to where livestock is for feeding, and thus the need for efficient transportation of these bales.

Previous inventions have been used to lift and transport such large bales of material, all of which have some limitations. For example, Baxter, U.S. Pat. No. 4,204,790, describes a trailer which lifts bales by a system of several hydraulic cylinders, resulting in inefficient usage of the tractors own three-point hitch. Moreover, the apparatus contemplated requires more materials to construct than does the present invention, which translates to greater costs for the consumer and thus a less useful product. Looking to other prior inventions, the operator must leave the control position to perform some operations, which results in an inefficient use of time by the operator, and impairs productivity.

Another problem with many of the inventions so far developed is the inherent unreliability which results as more intricate mechanisms are used to accomplish the same results as are accomplished by simpler means.

Accordingly, a primary object of the invention is to provide an improved bale lifting and transporting device.

Another object is to provide a bale lifting and transporting device which can be operated completely without leaving the control position.

Another object is to provide a bale lifting and transporting device which utilizes a minimum number of elements, thereby limiting the potential unreliability of the device.

Another object of the present invention is to provide for efficient use of the three-point hitch emplaced on the greater number of tractors in use now, by utilizing the lift mechanism inherent to the hitch.

Still another object is to provide a bale lifting and transporting device which facilitates ease of use.

Yet another object is to provide a bale lifting and transporting device which can carry not only one bale, but a plurality of bales.

Finally, another object is to provide a bale lifting and transporting device which is durable in construction and safe to use.

SUMMARY OF THE INVENTION

The present invention provides an improved, more efficient apparatus for lifting and transporting large bales of material, such as cylindrical bales of hay.

Generally, the apparatus comprises an inverted, substantially U-shaped frame including a pair of opposite legs and a transversely extended top cross bar; on vertically adjustable ground wheel support means, and a pair of generally parallel elongated bale support means, such as tines, each connected to a respective leg of the frame adjacent to the lower end of each leg, the tines extending longitudinally fore and aft of the frame in transversely spaced apart relation. Connected to the frame and the wheels are power means which serve to raise and lower the frame. The tongue of the trailer extends from the frame to the hitch point on the towing device, the towing device preferably a tractor equipped with a three-point hitch, and interposed between the hitch point and the frame are two pivot joints adjacent to each other, the first pivot joint allowing rotational movement of the trailer in a substantially vertical plane, and a second pivot joint allowing motion about a substantially upright axis upon steering movement of the tractor. A member extends between and is connected to this second pivot joint and the three-point hitch.

In the preferred embodiment, the point at which the aforementioned member, which shall be known as the positioning bar, is connected to the three-point hitch would be a pivot joint allowing motion in a substantially horizontal plane. To the positioning bar would then be attached a second power means for pivotally moving the positioning bar between a transport position wherein the trailer is arranged in a generally aligned relation behind a towing device and a working position wherein the trailer is arranged outwardly of and behind a towing device to which the hitch means is connected.

In lifting and transporting a bale of material, the apparatus is moved so that the bale of material is in front of the apparatus. The power means attached to the wheels are then engaged, lowering the frame and tines. The three-point hitch is also lowered, resulting in the tines being substantially parallel with and substantially adjacent to the ground. The apparatus is then moved forward, resulting in the tines passing under the bale on opposite sides. The three-point hitch and power means attached to the wheels are then engaged, lifting the frame and tines, and thus also the bale. Transport of the bale can then be achieved.

DESCRIPTION OF THE PREFERRED EMBODIMENT

Figure 1:
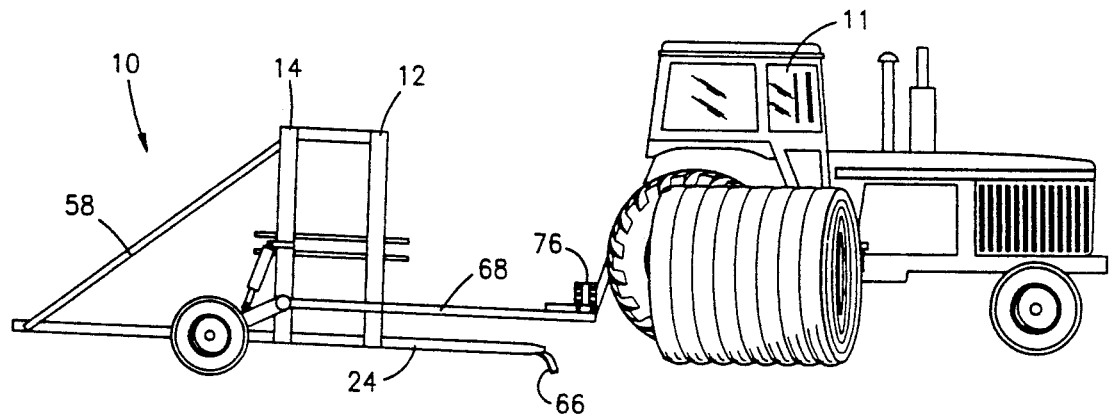
FIGS. 1, 2, and 3 are side perspective views of the bale lifting and transporting device in use, showing how the bales are approached and emplaced upon the device.

Referring to the drawings, the present invention is shown as a trailer adapted to lift and transport large bales of hay. The trailer preferably comprises two inverted U-shaped members 12 and 14 placed substantially parallel to each other. A pair of elongate frame members 16 and 18 extend between and are connected to the top cross members of the inverted U-shaped members 12 and 14, in effect, attached to the bottom of the respective U's. Extending downwards and angling inward from the ends of the U-shaped members 12 and 14 are a plurality of struts 20a-f which on each side are connected to a pair of longitudinally running, generally parallel elongate bale support tines 22 and 24. In the preferred embodiment, the front struts should be connected to the tines 22 and 24 approximately one-third (⅓) the length of the support tines rearward from the front end of the support tines. Extending between and connected to the rear of the bale support tines is a cross member 28. Extending outwardly from and connected to each respective leg of the rearward U-shaped frame member are a pair of wheel support struts 30 and 32, substantially perpendicular to the leg of the frame section in the preferred embodiment. Attached to each of the wheel support struts, 30 and 32 extending downward and angling rearward substantially parallel with the longitudinal bale support tines are members 34 and 36. The lower ends of the members are connected to axles 38a and 38b to which at least one wheel 40a and 40b is rotatably mounted (in the preferred embodiment there are two wheels rotatably mounted).

At the upper end the members 34 and 36 are connected to the wheel support struts 30 and 32 by pivot joints 42a and 42b, which allow rotational movement of the wheel assembly about a substantially horizontal pivot axis substantially perpendicular to the longitudinal axis of the trailer 10.

Figure 6:
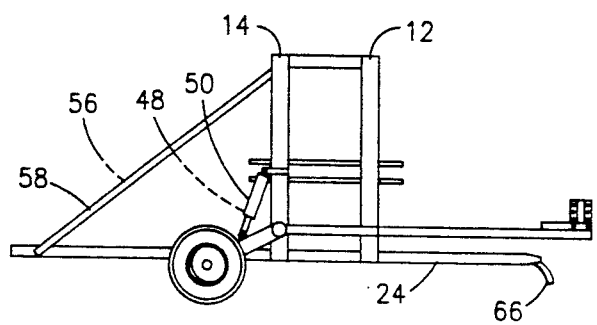
FIG. 6 is a side elevational view elevational showing the frame and struts of the trailer and the power means which raises the frame.
Figure 7:
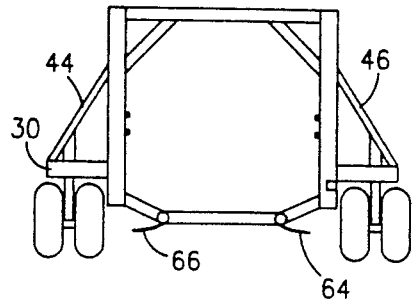
FIG. 7 is a rear elevational view showing the cross bar at the rear of the bale support means and other aspects.

As best illustrated in FIG. 7 extending downwards and outward from opposite sides of the rearmost U-shaped frame section are support struts 44 and 46 which are connected to the wheel support struts 30 and 32. Extending from the aforementioned support struts 44 and 46 and connected to the lower ends of the members 34 and 36 are a pair of first power means 48 and 50, which are best seen in FIG. 6.

The first power means includes hydraulic cylinders 48 and 50 which pivot the wheels 40a and 40b and members 34 and 36 about the generally horizontal axis of the pivots 42a and 42b, thus raising or lowering the frame 12 and 14, and thereby raising or lowering the trailer 10.

Figure 4:
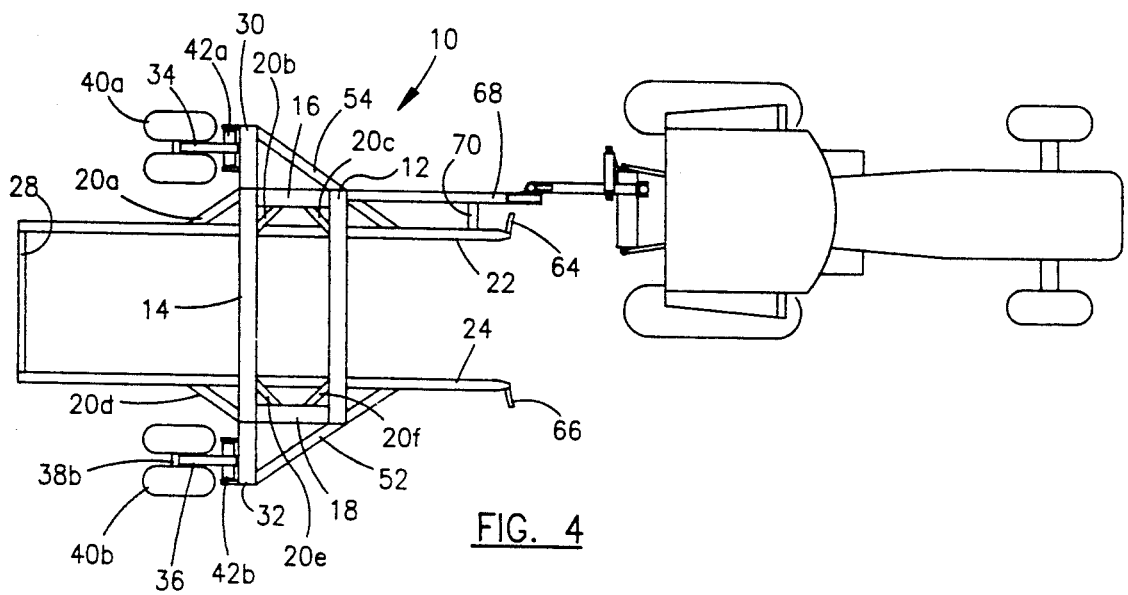
FIG. 4 is a top plan view showing the trailer in transport position and clearly depicting how the trailer lounge is connected to the three-point hitch.

Extending between and connected to the bottom of the forward U-shaped member 12 and the outer ends of each wheel support strut 30 and 32 are additional support struts 52 and 54 as shown in FIG. 4.

As seen in FIG. 6, extending between and connected to the upper portion of the rearward U-shaped frame section 14 and the rear section of the bale support tines 22 and 24 are two or more support braces 56 and 58, whereby heavy loads do not warp the bale support tines 22 and 24.

As shown on FIG. 7 extending between, and connected to the top and sides of each U-shaped frame member 12 and 14 are support struts whereby transverse motion of the frame sections 12 and 14 is dampened.

Extending from the front of each of the bale support tines 22 and 24 and angling outward are two or more directionally adjusting extensions 64 and 66, whereby the bale support tines 22 and 24 adjust to the optimum load positioning and are prevented from piercing the ground.

In FIG. 4, there can clearly be seen the trailer tongue 68 which extends from and is connected to both the rear and front U-shaped frame members 12 and 14 on the outer side of those members, and above the bale support tines 22 and 24.

In the preferred embodiment, extending between and connected to the forward end of the trailer tongue 68 and the forward end of the adjacent bale support tine 22 is a support strut 70, whereby the bale support tine 22 is further strengthened.

Figure 8:
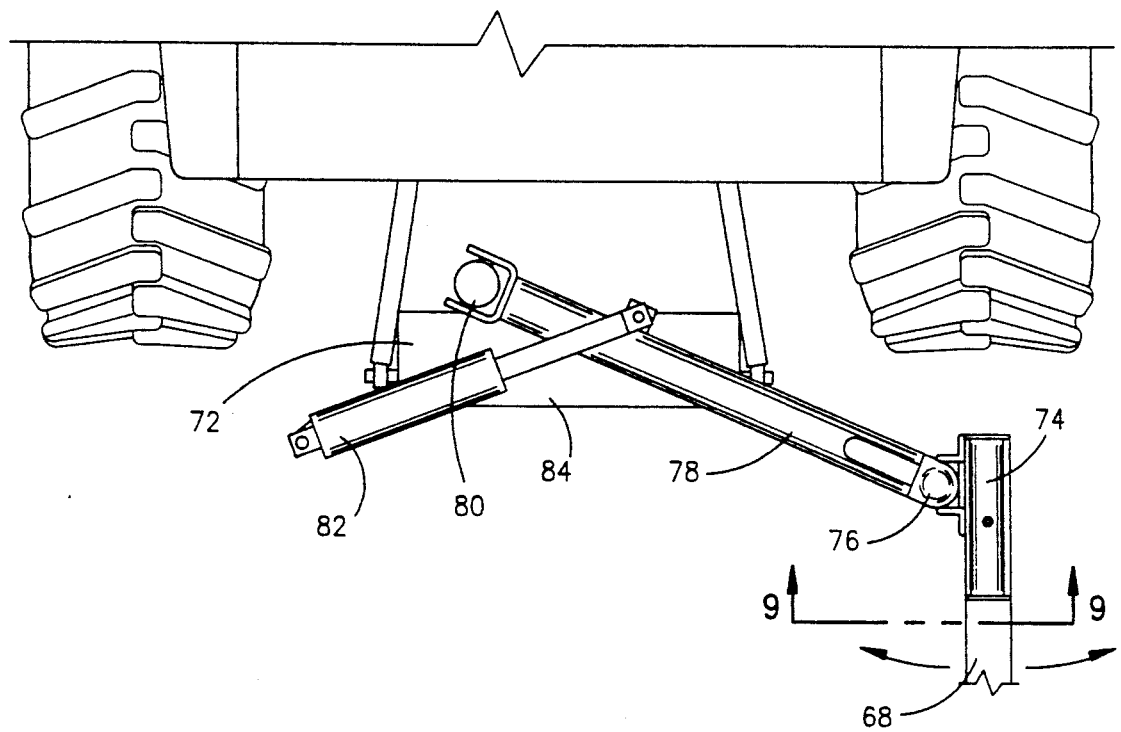
FIG. 8 is an enlarged top plan view showing the three-point hitch, the second power means for adjusting the positioning bar, and the two pivot joints between the positioning bar and the trailer tongue.

Looking to FIG. 8, there is exhibited an enlarged top plan view of the forward end of the trailer tongue 68 and the trailer's connection with the three-point hitch 72 on the towing device 11. The trailer tongue 68 ends in a first pivot joint 74 which allows rotational motion of the trailer tongue 68 in a substantially vertical plane which is generally perpendicular to the longitudinal axis of the trailer 10, as shown by the arrows marked "g" in FIG. 9. Directly adjacent and connected to the first pivot joint 74 is a second pivot joint 76, which is substantially perpendicular to the first pivot joint. The second pivot joint 76 allows movement in a generally horizontal plane around a generally upright pivot axis, whereby the trailer 10 can respond to steering movements of the towing device 11.

Extending between and connected to the second pivot joint 76 and the three-point hitch 72 is a positioning bar 78.

Figure 5:
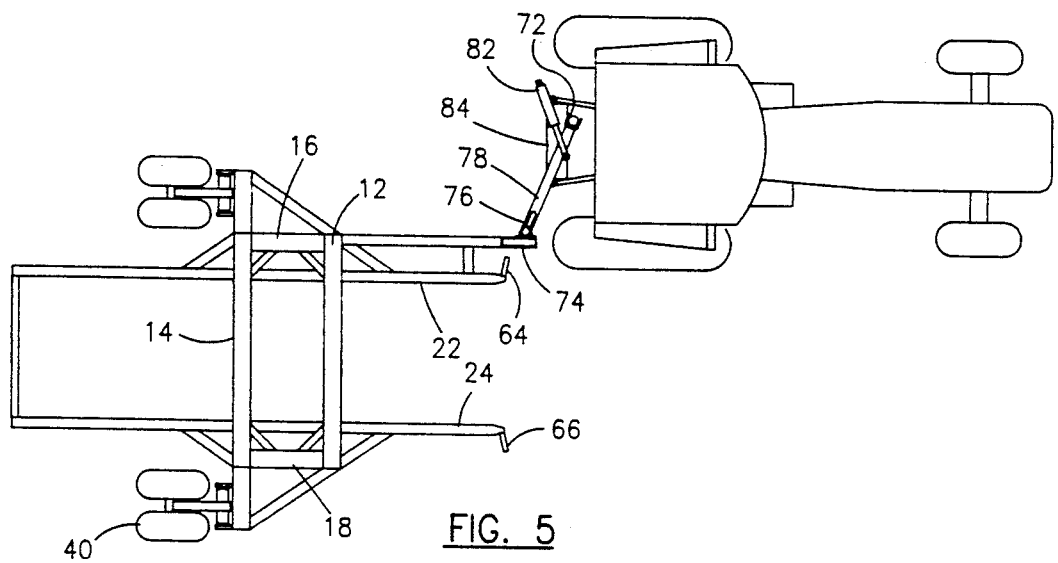
FIG. 5 is a top plan view showing the trailer in working position clearly depicting the extended positioning arm.

The positioning bar 78 can be connected to the three-point hitch 72 in a substantially unadjustable fashion wherein the trailer 10 is set to the side of the towing device 11 in the working position, as shown in FIG. 5. However, in the preferred embodiment, the positioning bar 78 would be connected to three-point hitch 72 wherein in between the member 78 and the three-point hitch 72 is a third pivot joint 80 allowing pivotal motion of the positioning bar 78 about a generally upright axis. Pivotal motion of the member 78 is controlled by a second power means such as hydraulic cylinder 82 which extends between and is connected to the positioning bar 78 and the three-point hitch platform 84. Engaging the second power means 82 pivotally moves the positioning bar 78 between a transport position wherein the trailer 10 is arranged in a generally aligned relation behind the towing device 11 and a working position wherein the trailer 10 is arranged outwardly of and behind the towing device 11, as in FIG. 5.

Figure 9:
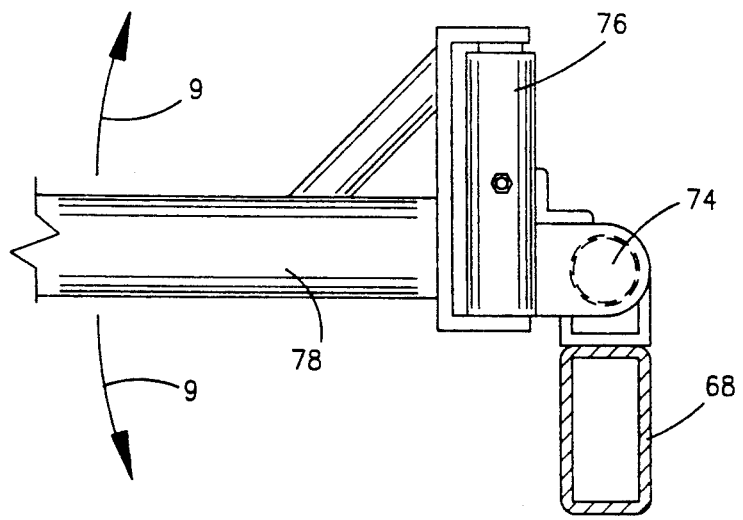
FIG. 9 is an enlarged front elevational view of the pivot joints between the positioning bar and the trailer tongue.

FIG. 9 is an enlarged front elevational view of the first and second pivot joints 74 and 76. In the preferred embodiment, the pivot joints would be constructed in a "pipe within a pipe" manner, thus allowing pivotal movement in a plane substantially perpendicular to the pivot axis, while allowing substantially no movement in other planes, and strengthening the entire pivot assembly.

Referring to FIGS. 5 and 6, the first and second power means 48, 50, and 82 are hydraulically operated ram means. Hydraulic fluid is introduced under pressure through hydraulic lines not pictured to the top of the cylinder section of the rams 48, 50, and 82 when the rams are to be extended. When the rams are to be shortened, hydraulic fluid is introduced under pressure to the bottom of the rams 48, 50, and 82. The pressurized hydraulic fluid is provided by conventional means associated with the towing device 11 or any other suitable means. In the preferred embodiment, operation of the first and second power means and the three-point hitch is independently controllable, thus allowing combinatory use of any or all of the three.

When the trailer 10 is used to lift and transport one or more bales of material, the trailer 10 is first moved into working position as in FIG. 5 by engaging the second power means hydraulic ram 82, which extends and pivots the positioning bar 78 about the third pivot joint so, thus moving the trailer 10 into working position. The trailer frame is then lowered by engaging the first power means hydraulic rams 48 and 50 which shorten, bring the wheels upwards, and thus lower the frame, and by engaging the three-point hitch 72 which lowers, thus lowering the positioning bar 78 and thus the tongue 68 which in turn affects the front ends of the bale support tines 22 and 24, lowering them also.

The bale to be picked up is substantially aligned with the bale support tines 22 and 24 such that the bale will fit between them. The towing device 11 then pulls the trailer 10 forward, as shown in FIG. 1. If the bale is slightly off-center, the directionally adjusting extensions 64 and 66 substantially align the bale between the bale support tines 22 and 24.

Once the bale support tines 22 and 24 are underneath the bale to be lifted, the procedure described above for lowering the frame and tines is reversed, thus raising the frame and tines and lifting the bale. The trailer 10 can then be swung back into the previously described transport position or left in the working position to pick up more bales.

Figure 2:
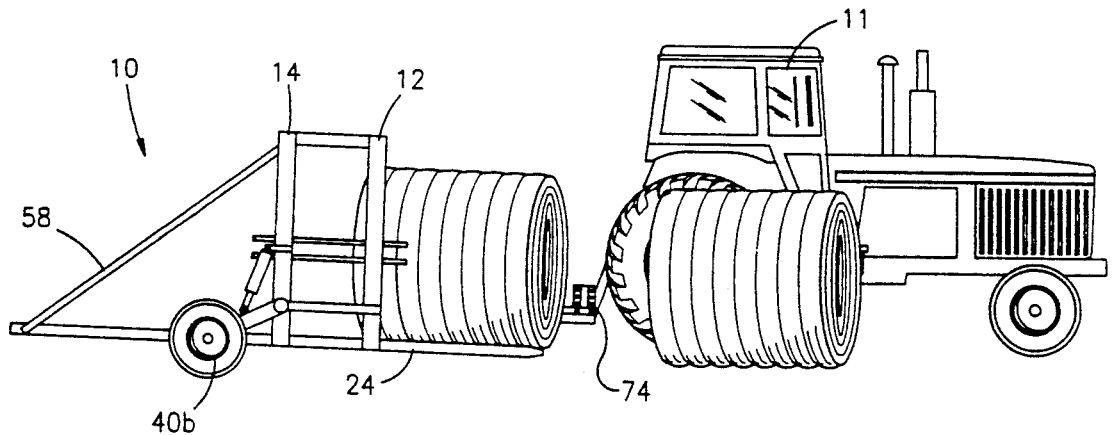
Figure 3:
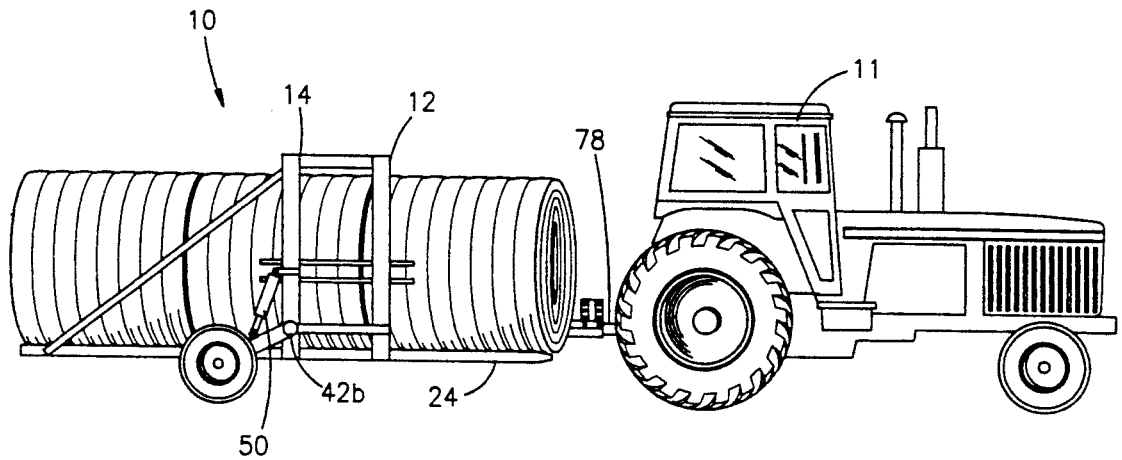

When one or more bales are already being transported, and another is to be lifted, in the preferred embodiment the lowering of the frame and tines would not take place until the bale to be lifted was substantially directly in front of the bale support tines 22 and 24 as shown in FIG. 2. In this fashion, maximum use of the bale support tines length is achieved, and a maximum number of bales can be carried as in FIG. 3.

As shown above, it is seen that the objects of the invention are achieved, in addition to other advantageous results.

As various changes could be made in the above described embodiment by those skilled in the art, it is intended that the exact construction and operation shown above be interpreted as illustrative and not as limiting.

The ease of use of the bale lifting and transporting device is evident from the above usage description. There should occur substantially no event requiring the operator to leave the control position of the towing device, thus maximizing efficient use of the operator's time.

Being front-loading, the bale lifting and transporting device allows substantially easier loading than many previous bale transport devices. The simplicity of the design of the present invention also avoids many of the breakdown problems complex units in this field would potentially have. Also, use of the towing device's own three-point hitch results in a much more efficient usage of the devices already owned by the operator, thus saving the owner/operator time and money.

I claim:

1. A trailer, adapted to be towed by a towing vehicle, for picking up and transporting large bales of hay, said trailer comprising:
    an inverted, substantially U-shaped frame including a pair of opposing legs and a transversely extended top cross bar;
    vertically adjustable ground wheel support means operatively connected to said frame on opposite sides thereof;
    a pair of generally parallel elongated bale support means, each of the pair connected to a respective leg of said frame adjacent to the lower end of said leg, said bale support means extending longitudinally fore and aft of said frame in transversely spaced apart relations;
    a first power means operatively connected to said ground wheel support means and said frame, said first power means being operative to raise and lower said frame on said ground wheel support means; and
    a hitch means having a forward end adapted for connection to a three-point hitch of a towing vehicle, a rearward end operatively, connected to said frame, and first and second pivot joints interposed between said forward and rearward ends of said hitch means for pivotal movement about a longitudinal axis and an upright axis substantially perpendicular to said longitudinal axis whereby said frame and said bale support means pivot about said upright axis upon steering movement of a towing vehicle to which said hitch means is connected and about said longitudinal axis upon raising and lowering of the three-point hitch of said towing vehicle.

2. The trailer of claim 1 wherein said hitch means further comprises a three-point hitch bar having opposite ends adapted for connection to the lift arms of a three-point hitch, and a positioning bar having a forward end connected to said three-point hitch bar for pivotal movement about a generally upright axis and a rearward end adapted for connection to said second pivot joint, and a second power means for pivotally moving said positioning bar between a transport position wherein said frame is arranged in a generally aligned relation behind a towing vehicle and a working position wherein said frame is arranged outwardly of and behind a towing vehicle to which said hitch means is connected.

3. The trailer of claim 1 further wherein said frame includes forward and rearward inverted U-shaped frame sections and brace means rigidly connected to and extending between said frame sections.

4. The trailer of claim 1 further comprising a cross member connected to and extending between said bale support means.

5. The trailer of claim 1 wherein the bale support means includes two or more directionally adjusting extensions, extending from the front of each bale support means to adjust to the optimum load positioning.

6. The trailer of claim 4 wherein said directionally adjusting extensions prevent said bale support means from piercing the ground.

7. The trailer of claim 1 wherein said hitch means adapted for connection to a three-point hitch includes a bar extending between and connected to said pivot points, said bar adapted to be raised and lowered by said three-point hitch, thus raising and lowering said frame and said bale support means.

8. The trailer of claim 2 wherein said first power means, said second power means, and said three-point hitch are separately controllable.

9. The trailer of claim 2 further comprising two or more angled braces extending between and connecting to said frame and a rear section of said bale support means, whereby support is provided for the rear section of said bale support means.

10. The trailer of claim 2 further comprising a trailer tongue extending between and connected to said first pivot joint and said frame substantially parallel with said bale support means.

11. The trailer of claim 10 further comprising a transverse strut extending between and connecting to the forward section of said trailer tongue and the adjacent bale support means.

* * * * *